(12) United States Patent
Lee

(10) Patent No.: US 8,432,490 B2
(45) Date of Patent: Apr. 30, 2013

(54) DISPLAY SYSTEMS AND INFORMATION DISPLAY METHODS THEREOF

(75) Inventor: Kun-Bin Lee, Hsin-Yi District (TW)

(73) Assignee: Mediatek Inc., Hsin-Chu (TW)

( * ) Notice: Subject to any disclaimer, the term of this patent is extended or adjusted under 35 U.S.C. 154(b) by 530 days.

(21) Appl. No.: 12/649,592

(22) Filed: Dec. 30, 2009

(65) Prior Publication Data

US 2010/0165199 A1    Jul. 1, 2010

(30) Foreign Application Priority Data

Dec. 31, 2008    (TW) ................................ 97151729 A

(51) Int. Cl.
*H04N 5/445*    (2011.01)

(52) U.S. Cl.
USPC .......................................... 348/563; 348/734

(58) Field of Classification Search .................. 348/563, 348/734
See application file for complete search history.

(56) References Cited

U.S. PATENT DOCUMENTS

| | | | |
|---|---|---|---|
| 5,473,609 A | 12/1995 | Chaney | |
| 6,097,441 A * | 8/2000 | Allport | 348/552 |
| 6,532,592 B1 | 3/2003 | Shintani et al. | |
| 7,098,772 B2 | 8/2006 | Cohen | |
| 7,109,908 B2 | 9/2006 | Griesau et al. | |
| 7,109,974 B2 | 9/2006 | Kempisty | |
| 7,992,187 B2 | 8/2011 | Chiao | |
| 2005/0101314 A1* | 5/2005 | Levi | 455/423 |
| 2006/0215065 A1 | 9/2006 | Kimura | |
| 2008/0276293 A1 | 11/2008 | Perry et al. | |
| 2010/0157167 A1* | 6/2010 | Lawther et al. | 348/734 |
| 2011/0265115 A1 | 10/2011 | Alten | |

* cited by examiner

*Primary Examiner* — Pankaj Kumar
*Assistant Examiner* — Charles N Hicks
(74) *Attorney, Agent, or Firm* — McClure, Qualey & Rodack, LLP

(57) ABSTRACT

An information display method implemented in a display system is provided, comprising an electric appliance and a remote controller. First, when receiving message input, the electric appliance determines whether to display the message on the main display in accordance with the specific mode. If the specific mode is in a first mode, the received message is displayed on the display of the remote controller and is kept from displaying on the main display. If the electric appliance is not in a first mode, the received message is displayed on the main display.

20 Claims, 6 Drawing Sheets

DISPLAY SYSTEMS AND INFORMATION DISPLAY METHODS THEREOF

CROSS REFERENCE TO RELATED APPLICATIONS

This Application claims priority of Taiwan Patent Application No. 097151729, filed on Dec. 31, 2008, the entirety of which is incorporated by reference herein.

BACKGROUND OF THE INVENTION

1. Field of the Invention

The invention relates to display system, and more particularly, to information display methods for display systems.

2. Description of the Related Art

With technological advancement, internet access through some portable devices, such as cell phones, remote controls, video game joy-sticks, and etc...., has become more popular. When acquiring information through the internet, personal and private information of users, such as their password, identification card number, credit card number or bank account amount, may be requested for input or reviewed. Unlike a personal computer however, an electric appliance, such as a television, is usually placed in a public place such as the living room. If the television is used for displaying personal and private information, the personal and private information may be easily accessed by unauthorized parties. Therefore, a display method and system for preventing personal and private information from being accessed by unauthorized parties through use of electric appliances is desirable.

BRIEF SUMMARY OF THE INVENTION

Display systems and methods are provided for protecting personal and private information.

In one embodiment, an information display method implemented in a display system is disclosed. The display system comprises an electric appliance and a remote controller, each equipped with a display. First, when receiving message input, the electric appliance determines whether to display the message based on a specific mode. If the specific mode is switched to a first mode, the received message is displayed on the display of the remote controller and is kept from being displayed on the main display. If the specific mode is not in a first mode, the received message is displayed on the main display of the electric appliance. In some embodiments, the main display is not built in the electric appliance and the electric appliance is a central controller. If the specific mode is in a second mode, the received message is not only being displayed on the main display but also displayed on the display of the remote control. If the specific mode is in a third mode, the received message is displayed on the main display only but not displayed on the display of the remote control.

In another embodiment, an information display method for a display system is disclosed. The display system comprises an electric appliance and a remote controller, each equipped with a display. First, a request to display a message is received by the electric appliance. It is then determined whether to display the message on the main display or the display of the remote controller according to a specific mode or the confidential property of the message.

In another embodiment, an information display method for a display system is disclosed. The display system comprises an electric appliance and at least first and second remote controllers, each equipped with a display. First, a request to display a message is received by the electric appliance. It is then determined whether a display is to display the message based on a display selection. If the display selection is a first selection, the message is displayed on the display of the first remote controller and is kept from being displayed on the display of the second remote controller or that of the electric appliance. If the display selection is a second selection, the message is displayed on the display of the second remote controller and kept from being displayed on the display of the first remote controller or that of the electric appliance.

In another embodiment, a display system is disclosed. The display system comprises a main display, a remote controller and a controller. The main display is disposed on an electric appliance or external of an electric appliance and the remote controller is equipped with a display. When receiving message input, the controller determines whether to display the received message by the electric appliance based on a specific mode, and if the electric appliance is switched to a first mode, displays the received message on the display of the remote controller and keeps the message from being displayed on the main display, and displays the message on the main display if the specific mode is not in a first mode.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Hardware Configuration Embodiments

Figure 1:
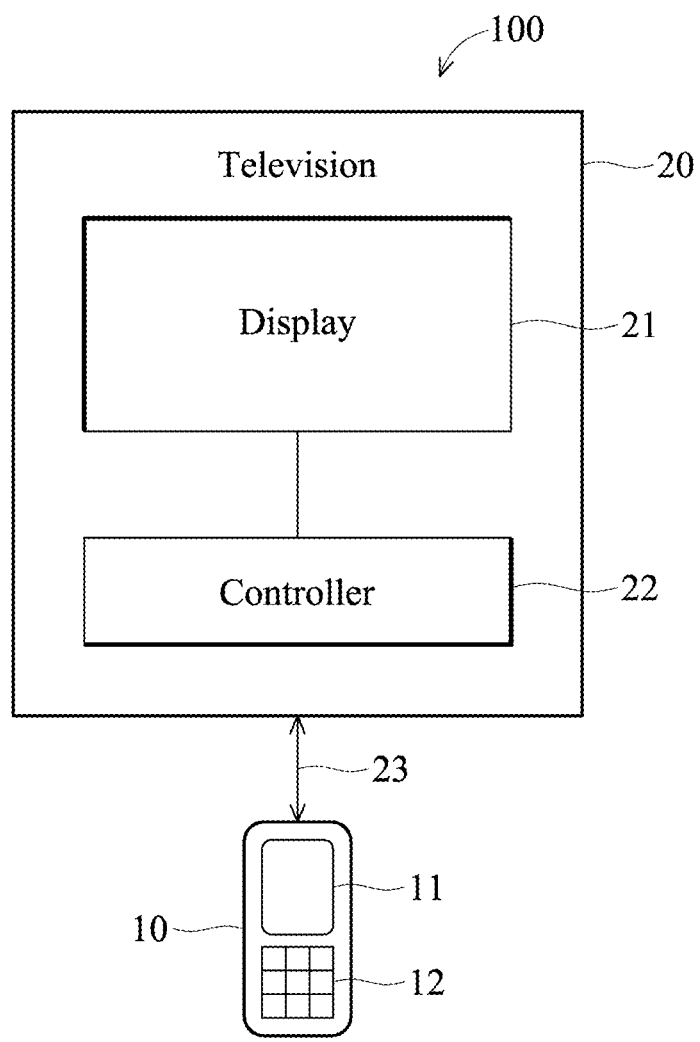
FIG. 1 is a schematic diagram illustrating an embodiment of a display system according to the invention.

Referring to FIG. 1, a remote controller 10 is coupled to a television 20 and a controller 22 of the television 20 via a communication channel 23. The communication channel 23 may be a wired or a wireless communication channel. The wireless communication channel may be established by Bluetooth, infra-red, radio frequency or other wireless connection techniques.

Figure 2:
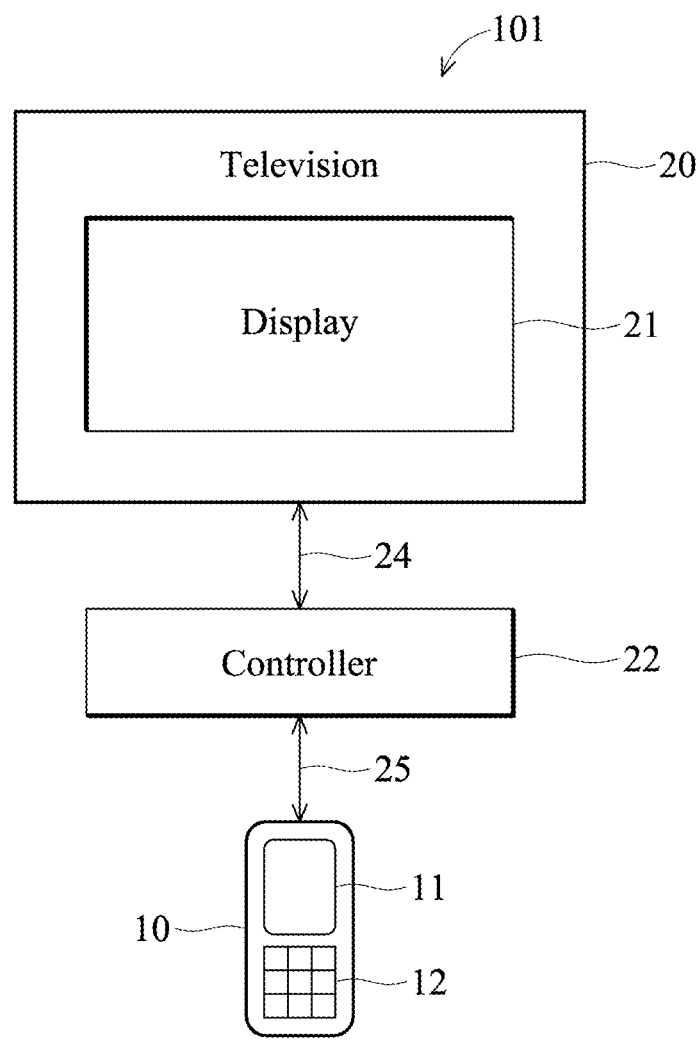
FIG. 2 is a schematic diagram illustrating another embodiment of a display system according to the invention.

An electronic device 100 comprises the television 20, which comprises a display 21 and a controller 22, and a remote controller 10. The display 21 is the main display of the television 20. The remote controller 10 further comprises a display 11 and an input device 12. The displays 21 and 11 may be referred to as the main display and the secondary display of the television 20, respectively. The input device 12 may comprise keyboard, touchable, voice-controlled or other input devices. According to an operation signal generated by the input device 12, the remote controller 10 may send signals via the communication channel 23 for controlling the television 20, such as volume controlling, channel selection, power controlling, brightness/contrast adjustment and/or message inputting. The controller 22 may be a micro-controller or a micro-processor of the television 20 for controlling video display and related operations of the television 20. FIG. 2 is a schematic diagram illustrating another embodiment of a display system according to the invention.

As shown in FIG. 2, the controller 22 is separately configured from the television 20. Communication channels 24 and 25 which are coupled to the television 20, the controller 22 and the remote controller 10 may be wired or wireless communication channels. The controller 22 may be a computer system or a game player. The remote controller 10 may serve as an output or input device of the controller 22 for operating the controller 22. It is to be noted that, although the television 20 is used as an example in embodiments of the display systems 100 and 101, the television 20 may be replaced by other display devices such as a projector, a monitor or other displays for performing information display methods as described below.

The television 20 may have many external video data resources. The television 20 may further comprise a wireless receiver for receiving and displaying broadcasted video signals. The television 20 may also comprise a receiver for receiving and displaying video signals from external devices. For example, the external device may be a video recorder, a computer device, a digital camera or other electronic devices. The television 20 may comprise a network interface (e.g. a network interface card) for connecting to a connection network so as to receive data from or transmit data to the connection network and display data downloaded from the network. The connection network may be a wired/wireless local area network (LAN) or Internet. The television 20 and the remote controller 10 may separately comprise a receiver and a transmitter for communication with each other. The television 20 and the remote controller 10 may separately comprise a controller for performing the information displaying method.

The television 20 may receive a request from the input device (e.g. the remote controller 10) and display a corresponding message to response to the request. The message may be text, image, motion picture, user interface, webpage, any videos, or in-combination.

Information Display Methods

The television systems 100 and 101 may provide an operation interface for switching a mode of the television. For example, the operation interface may be one of keys disposed on the remote controller 10 for switching the television to enter into or exit from a specific mode (hereinafter referred to as a private mode). The operation interface may be one of menu items on a menu provided by the television 20 for switching the television to enter into or exit from the private mode. Similarly, the interface for switching the television to enter into or exit from the specific mode may be implemented by a voice-controlled device or the like. The key and the menu may be physical keys and menus that are implemented by hardware circuits or may be virtual keys and menus displayed on any displays.

The controller 22 may access a register or a bit within the memory for representing whether the private mode of the television 20 is enable or disabled. When the private mode of the television 20 is enabled, the television 20 enters into the private mode. When the private mode of the television 20 is disabled, the television 20 exits from the private mode. The function of specific mode may be configured within the remote controller 10, the television 20 or the controller 22

When the television 20 is used for inputting or displaying confidential data/information that is needed to be protected such as personal information, the following information method may be used for preventing the confidential data/information from being displayed on the display 21 of the television 20.

First Embodiment

Figure 3A:
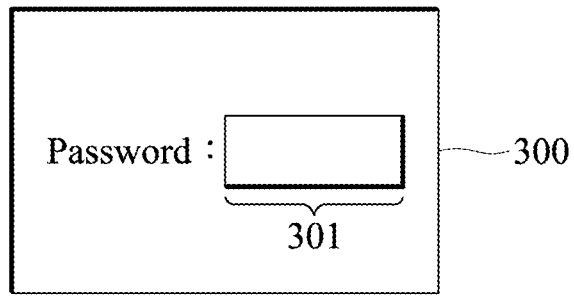
FIG. 3A is a schematic diagram illustrating an embodiment of a message input interface.

For example, as shown in FIG.3A which illustrates an input interface 300, a field 301 is used for receiving message input as a password. The password contains important personal information that should not be known by others. The displays 21 or 11 display the information as shown in the input interface 300 once the television 20 receives message from the remote controller 10.

Figure 4:
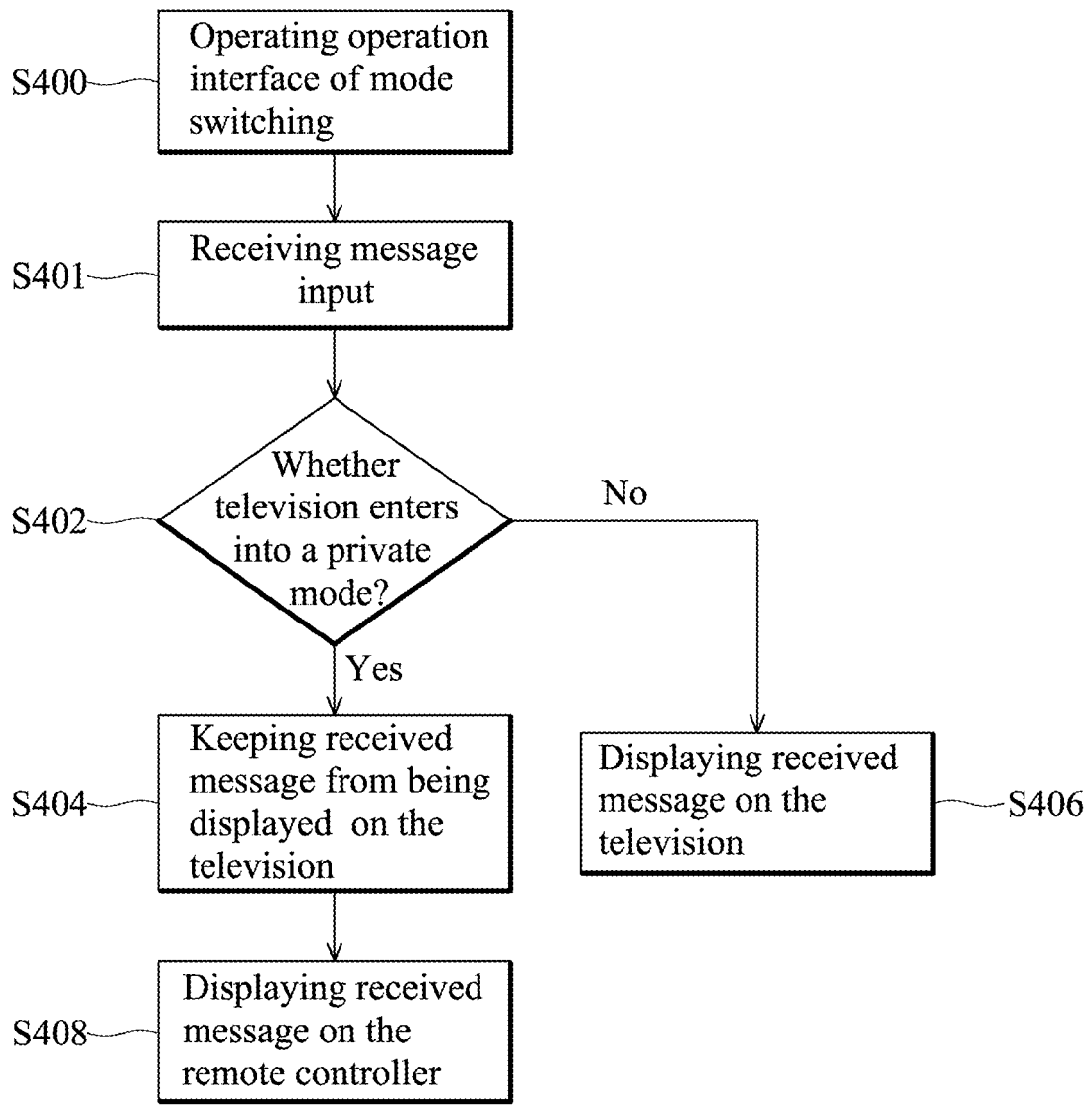
FIG. 4 is a flowchart showing an embodiment of an information display method according to the invention.
Figure 5:
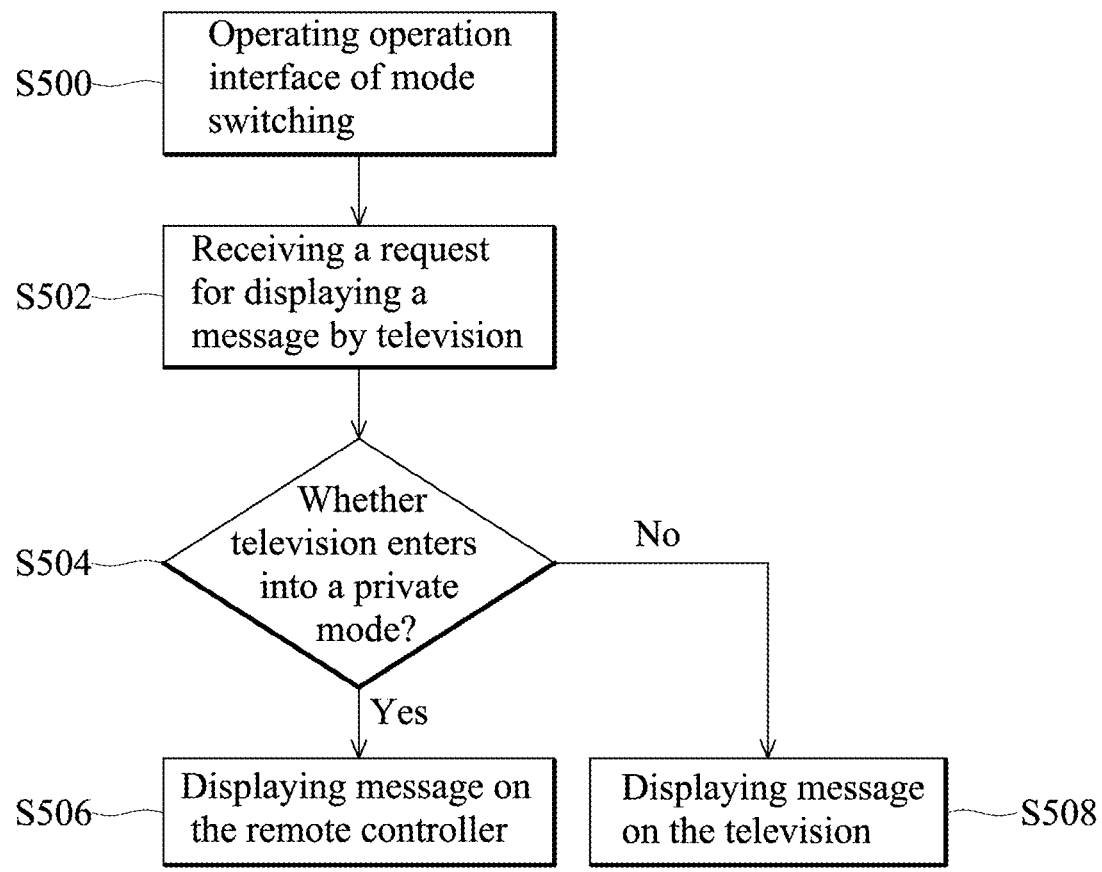
FIG. 5 is a flowchart showing another embodiment of an information display method according to the invention.
Figure 6:
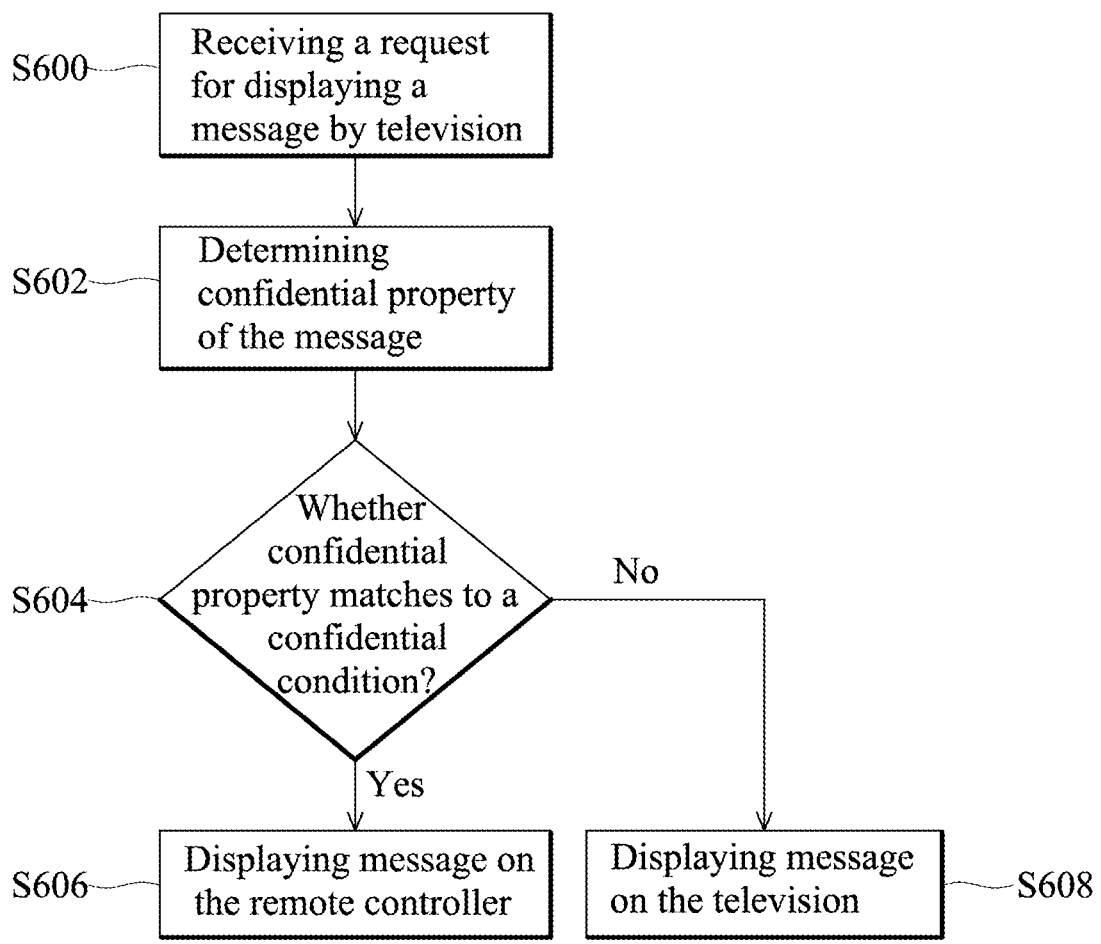
FIG. 6 is a flowchart showing yet another embodiment of an information display method according to the invention.

Please refer to FIG. 4. First, user operates the operation interface of mode switching (step S400). Note that, although in this embodiment, the operation interface of mode switching is manually operated, the controller 22 may automatically determine a confidential property of the message input field (e.g. field 301) and automatically switch the mode of the television 20 to the private mode. For example, the mode of the television 20 may be automatically switched to the private mode when the controller 22 determines that the confidential property of the field 301 belongs to ⌈personal information⌋ and the information is either hidden from the display 21 by showing the blank display on the display 21 or switching the mode to play regular TV programming on the display 21.

When the television 20 receives a message input (step S401) and the mode of the television 20 is determined, whether to display the received message can be determined according to the mode of the television 20 (step S402). It is to be noted that the message input may comprise at least inputted numbers and symbols, but is not limited thereto. In step S402, the controller 22 determines whether the television 20 has entered into the private mode. If the television 20 has entered into the private mode, the controller 22 keeps the received message from being displayed on the display 21 of the television 20 (step S404). For example, if the message received by the television 20 is numbers "1234", the controller 22 displays the interface 300 shown in FIG. 3C on the display 21 in which symbols "****" are used for representing the numbers "1234", wherein each "*" represents one character of the numbers "1234". Alternatively, the numbers "1234" may be represented without any symbols such that the controller 22 maintains the interface 300 shown in FIG. 3A on the display 21 without updating display content of the display 21.

If the television 20 is not in the private mode, the controller 22 displays the received message on the display 21 of the television 20 (step S406). For example, if the message received by the television 20 is numbers "1234", the controller 22 displays the interface 300 shown in FIG. 3B on the display 21.

If the mode is determined to be in the private mode, the controller 22 may display the received message on the display 11 of the remote controller 10 (step S408). For example, the controller 22 may display the interface 300 shown in FIG. 3B on the display 11 or may display the interface 300 shown in FIG. 3C on the display 11 to further protect personal information in which symbols "****" are used for representing the numbers "1234", wherein each "*" represents one character of the numbers "1234". Alternatively, the controller 22 may represent the received message (i.e. numbers "1234") without any symbols such that only the interface 300 shown in FIG. 3A is displayed on the display 11.

In addition to receiving personal information from the input device, the television 20 may receive other confidential data from a lot of external data resources or from a memory of the television 20 and display it. In this case, the following information display method may be utilized to prevent the confidential data from being displayed on the display 21 of the television 20.

Second Embodiment

First, a user operates the operation interface of mode switching before the requested message is displayed by the television 20 (step S500). The television 20 receives a request for displaying a message (step S502). For example, the television 20 may receive a channel switch request, a webpage download request or any requests for displaying a message from the remote controller 10 or other input devices. The message may comprise a radio broadcasting program, webpage, input interface or any kinds of image messages.

The controller 22 then determines the mode of the television 20 and determines whether to display the message based on the mode of the television 20 (step S504). In step S504, the controller 22 determines whether the television 20 has entered into the private mode. If the television has entered the private mode, the controller 22 displays the message on the display 11 of the remote controller 10 and keeps it from being displayed on the display 21 of the television 20 (step S506). If the television is not in the private mode, the controller 22 displays the message on the display 21 of the television 20 (step S508).

Although the operation interface of mode switching is manually operated in the aforementioned embodiments, the television 20 may automatically detect the confidential property of the message and then automatically display the message on the display of television or that of the remote controller according to the confidential property of the message.

Third Embodiment

First, the television 20 or the controller 22 (e.g. the game player) receives a request for displaying a message (step S600). For example, the television 20 may receive a channel switch request, a webpage download request or any request for displaying a message from the remote controller 10 or other input devices. The message may comprise a radio broadcasting program, webpage, input interface or any kinds of image messages.

Figure 3B:
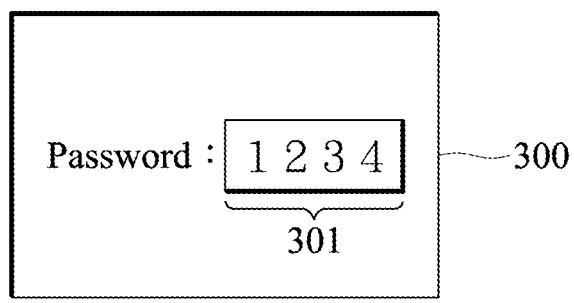
FIG. 3B is a schematic diagram illustrating an embodiment of inputting a message to the message input interface.
Figure 3C:
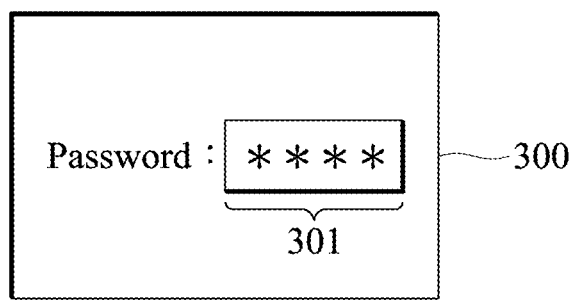
FIG. 3C is a schematic diagram illustrating an embodiment of a message input interface under the private mode.

The controller 22 then automatically determines the confidential property of the message (step S602) and determines whether to display the message based on the confidential property of the message (step S604). In step S604, the controller 22 determines whether the confidential property of the message matches a confidential condition. For example, the controller 22 may determine that the confidential property of the message data, which is obtained after the television 20 receives an inputted account number, user name and/or password (as shown in FIGS. 3A-3C), such as webpage or the like, to be personal information. Alternatively, the controller 22 may detect whether the television 20 acquires the message via a secure connection, and if so, determines the message received by the television 20 obtained from the secure connection to be personal information.

If the confidential property of the message matches the confidential condition, the controller 22 displays the message on the display 11 of the remote controller 10 and keeps it from being displayed on the display 21 of the television 20 (step S606). If the confidential property of the message does not match to the confidential condition, the controller 22 displays the message on the display 21 of the television 20 (step S608).

Application Embodiment

For example, in one embodiment, the controller 22 may be a game player and the remote controller 10 may be the remote controller of the game player. The aforementioned information display method may be utilized to improve the convenience and functionality of the game player.

When a game program is performed by the game player, game display that may be publicly viewed may be displayed on the display 21 while the game display that belongs to a dedicated player may be displayed on the display 11 of the remote controller 10. For example, when a POKER game program is performed by the game player, a game display that shows information for all players may be displayed on the display 21 while a game display that shows poker cards of a dedicated poker player may be displayed on the display 11 of the remote controller 10. All players may operate the remote controller 10 in sequence.

For example, it is assumed that N users operate the remote controller 10 in sequence where N is a positive integer larger than one. The remote controller 10 displays the dedicated display of the first user on the display 11. The remote controller 10 may provide a user switch interface (e.g. a key, a button, a touch panel and/or a voice-controlled device) for displaying the dedicated display of different user on the display 11. When the user switch interface is activated, the remote controller 10 displays the dedicated display of the next user on the display 11. The remote controller 10 may comprise a counter for counting the times the user switch interface has been activated. A counting value of the counter may be displayed on the display 11 for indicating a playing order of the game for the users. In addition to the playing order of the game, the remote controller 10 may simultaneously display different symbols, pictures or the likes and the dedicated display of a specific user for representing different users.

In another embodiment, the controller 22 may be a game player and the remote controller 10 may be the remote controller of the game player in which the game player may connect to multiple remote controllers 10, such as three remote controllers C1, C2 and C3, at the same time. By using the information display method of the invention, input information of a specific remote controller may be only displayed on a dedicated remote controller and may be kept from being displayed on remote controllers other than the dedicated remote controller based on a display selection. For example, based on a display selection corresponding to the remote controller C1, the input information of the remote controller C2 may be displayed on the display of the remote controller C1 and may be kept from being displayed on the remote controller C3 or the display 21. Alternatively, based on a display selection corresponding to the remote controller C3, the input information of the remote controller C2 may be displayed on the display of the remote controller C3 rather than that of the remote controller C1 or the display 21.

In another embodiment, the controller 22 may be a game player A which may be connected to multiple remote controllers 10 of which the game player A may be connected to one or more than one game player B via a network in which each game player B at least comprises a remote controller 10 corresponding thereto. By using the information display method of the invention, input information of a specific remote controller may only be displayed on a dedicated remote controller and may be kept from being displayed on remote controllers other than the dedicated remote controller based on a display selection. For example, if the game player A at least comprises remote controllers A1, A2 and A3, the first game player B comprises a remote controllers B1 and B2, the input information of the remote controller A1 of the game player A may be displayed on the display of the remote controller A2 and/or that of the remote controller B2 and may be kept from being displayed on the remote controller A3, B1 or the display 21. Alternatively, based on a display selection corresponding to the remote controller A3 and/or B1, the input information of the remote controller A1 may be displayed on the display of the remote controller A3 and/or B1 rather than that of the remote controller A2, B2 or the display 21.

In another embodiment, the controller 22 may be a controller of a multimedia player. By using the information display method of the invention, while performing a pre-process of a specific operation, such as photo/video previewing, audio play setting, play order setting and file shifting, execution of the pre-process may be performed on the remote controller first and then the execution result may be displayed on the display 21 after the pre-process of the specific operation has been completed or confirmed. For example, items for photo/image playing may be displayed on the display of the remote controller to perform a photo/video previewing (i.e. per-process of the photo/image playing) to select target photo/video to be displayed and the target photo/video is later displayed on the display 21 after the target photo/video has been selected.

Variation of the Embodiment

In some embodiments, the remote controller 10 may be a remote controller of the television, the game player or other electronic devices, a universal remote controller or a remote controller simulated by a mobile phone, a smart phone or a personal digital assistant (PDA).

In the embodiments, although the display 21 is configured with the television 20, the display 21 and the controller 22, the display 21 may also be configured with other appliances, such as a refrigerator, a washing machine, a washing-up machine, a electronic wardrobe, a microwave oven, an air conditioner, a central heater, a projector, a robot, an elevator, an entrance guard and so on.

Summary

Electric appliances equipped with displays, such as televisions, are usually placed in a public places such as the living rooms. With integration of electric appliances and internet access, the need arises for protecting personal and private information of users being displayed publicly on the electric appliances. Thus, by using the remote controller with a display and the aforementioned information display method of the invention, personal and private information of users can be prevented from being accessed by unauthorized parties through use of electric appliances.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. An information display method for a display system comprising an electric appliance having a main display and a remote controller having a display, comprising:
   receiving a message input from the remote controller;
   determining whether to display the received message based on a specific mode;
   displaying the received message on the display of the remote controller and keeping the received message from being displayed on the main display, if the specific mode is determined to be in a first mode; and
   displaying the message on the main display of the electric appliance if the specific mode is determined to be not in the first mode.

2. The information display method as claimed in claim 1, wherein the electric appliance comprises a television.

3. The information display method as claimed in claim 1, wherein the display system further provides an operation interface for switching the specific mode.

4. The information display method as claimed in claim 3, wherein the operation interface is a key which is disposed on the remote controller for switching the specific mode to enter into or exit from the first mode.

5. The information display method as claimed in claim 3, wherein the electric appliance further provides a menu having an item for switching the specific mode to enter into or exit from the first mode.

6. The information display method as claimed in claim 1, further comprising displaying a specific symbol on the display of the remote controller as the message when the specific mode is in the first mode.

7. An information display method for a display system comprising an electric appliance having a main display and a remote controller having a display, comprising:
   receiving a request for displaying a message;
   determining a confidential property of the message; and
   determining whether the message should be displayed on the main display or the message should be only displayed on a display of the remote controller, in accordance with a specific mode, wherein the specific mode is determined based on the confidential property of the message.

8. The information display method as claimed in claim 7, wherein the determining step further comprises:
   displaying the message on the display of the remote controller and preventing the message from being displayed on the main display if the specific mode is in a first mode, wherein the main display is located on the electric appliance or external of the electric appliance but is not the display of the remote controller; and
   displaying the message on the main display if the specific mode is not in the first mode.

9. The information display method as claimed in claim 7, wherein the determining step further comprises:
   displaying the message on the display of the remote controller and preventing the message from the main display if the specific mode is in a first mode, wherein the main display is located on the electric appliance or external of the electric appliance but is not the display of the remote controller; and,
   displaying the message on the main display and the display of the remote controller if the specific mode is in a second mode.

10. The information display method as claimed in claim 7, wherein the determining step further comprises:
    displaying the message on the main display only and preventing the message from being displayed on the display of the remote controller in a second mode.

11. The information display method as claimed in claim 7, wherein the specific mode is determined based on the confidential property of the message and the determining step further comprises:
    displaying the message on the display of the remote controller and preventing the message from being displayed on a main display if the confidential property matches a confidential condition; and
    displaying the message on a main display if the confidential property does not match the confidential condition.

12. The information display method as claimed in claim 7, wherein the electric appliance comprises a television display to act as the main display.

13. The information display method as claimed in claim 7, wherein the display system further provides an operation interface for switching the specific mode.

14. The information display method as claimed in claim 13, wherein the operation interface is a key which is disposed on the remote controller for switching the specific mode.

15. The information display method as claimed in claim 12, wherein the electric appliance further provides a menu having an item for switching the specific mode.

16. The information display method as claimed in claim 7, further comprising:
  displaying the message on the display of the remote controller for performing a pre-process of a specific operation; and
  displaying an execution result of the specific operation on the main display after the pre-process of a specific operation has been completed.

17. An information display method for a display system comprising an electric appliance and at least first and second remote controllers, each remote controller is equipped with a display, comprising:
  receiving a request for displaying a message by the electric appliance;
  determining whether to display the message based on a display selection;
  displaying the message on the display of the first remote controller and keeping the message from being displayed on the display of the second remote controller if the display selection is a first selection; and
  displaying the message on the display of the second remote controller and keeping the message from being displayed on the display of the first remote controller if the display selection is a second selection.

18. The information display method as claimed in claim 17, wherein the display system further comprises at least one third remote controller equipped with a display and the determining step further comprises:
  displaying the message on the display of the third remote controller and the first remote controller and keeping the message from being displayed on the display of the second remote controller if the display selection of the first remote controller corresponds to the display selection of the third remote controller.

19. The information display method as claimed in claim 17, further comprising:
  displaying the message on the display of the first remote controller and the display of the second remote controller for performing a pre-process of a specific operation; and
  displaying an execution result of the specific operation on a main display after the pre-process of a specific operation has been completed.

20. A display system, comprising:
  a main display;
  a remote controller, equipped with a display; and
  a controller for receiving a message input from the remote controller and determining whether to display the received message on the main display in accordance with a specific mode, wherein the received message is displayed on the display of the remote controller and is prevented from being displayed on the main display if the specific mode is a first mode and the received message is displayed on the main display if the specific mode is not in the first mode.

* * * * *